United States Patent [19]

Hacker

[11] 4,350,117
[45] Sep. 21, 1982

[54] FREE STALL CONSTRUCTION

[76] Inventor: Josef Hacker, Schulstrasse 7, 8254 Mittbach, Fed. Rep. of Germany

[21] Appl. No.: 239,416

[22] Filed: Mar. 2, 1981

[51] Int. Cl.³ .................... A01K 1/00; A01K 29/00
[52] U.S. Cl. ...................................................... 119/27
[58] Field of Search ............................. 119/14.03, 27

[56] References Cited

U.S. PATENT DOCUMENTS

| | | | |
|---|---|---|---|
| 1,841,141 | 1/1932 | Marshall et al. | 119/27 |
| 3,166,045 | 1/1965 | Bessette | 119/27 |
| 3,986,481 | 10/1976 | Glögger et al. | 119/27 |
| 4,217,860 | 8/1980 | Glöggler | 119/27 |

FOREIGN PATENT DOCUMENTS

| | | | |
|---|---|---|---|
| 2518643 | 11/1976 | Fed. Rep. of Germany | 119/27 |
| 7801583 | 6/1978 | Fed. Rep. of Germany | |
| 7819430 | 10/1978 | Fed. Rep. of Germany | |
| 2818197 | 11/1979 | Fed. Rep. of Germany | 119/27 |
| 2440686 | 7/1980 | France | 119/27 |

OTHER PUBLICATIONS

"Rindviehställe," Hanbuch für Landwirtschaftliches Bauen 1 by Dr. Günter Koller, BLV Verlagsgesellschaft, München, W. Germany, 1979, p. 61.

*Primary Examiner*—Gene Mancene
*Assistant Examiner*—Robert P. Swiatek

[57] ABSTRACT

A free stall construction for cattle is provided with open resting/feeding stalls. The stalls are separated by cantilevered tube members which are secured to the ground in the shoulder area of a reclining animal positioned in the stall. The tube members extend upward with increasing ground clearance and rearward with decreasing inclination from the shoulder area to an end area of the stall where a crossbeam rigidly connects the upper ends of the tubes at a height which does not hinder ingress or egress to the stall. Advantageously, the construction separates the cows, allows longitudinal movements in the stalls, provides stability and saves space.

13 Claims, 3 Drawing Figures

FREE STALL CONSTRUCTION

The invention refers to free stall constructions for cattle and notably to free constructions with open resting stalls or feed-resting stalls.

In such free stall arrangements the animals should have a comforatable resting stall and the animal resting or standing in a stall should be protected from other animals. Further, the stall construction should not hinder the natural sequence of movements when the animal is lying down or getting up. The stall construction should not pose a safety hazard for the animals and it should provide sufficient stability.

The present day stall constructions fulfill these requirements only partly. Usually, the individual stalls are separated from each other by tube elements. In one prior art stall construction the separation tubing comprises a forward vertical tube and a rearward vertical tube, which are both anchored in the ground. Further, both tubes are connected by an upper horizontal connecting tube and a middle tube at half height below the upper horizontal connecting tube (German utility model No. 78 19 430). This stall construction separates the animals from each other. However, the rearward vertical standing tube and the middle connecting tube limit the freedom of movement of the animals to an unacceptable extent. When the animal rests on the floor of the stall, it cannot occupy the most comfortable side position. Instead, it is forced to assume a position wherein the animal rests on the legs. This causes considerable pain, notably in the case of cows with high milk production and large utters. Further, frequent collisions with the middle tube occur when the animals get up from their resting position. Therefore, this prior art free stall construction is uncomfortable and damaging to the health and well-being of the animal with the consequence of a reduced milk production.

In order to overcome these difficulties, German utility model No. 78 01 583 suggests a modification of the above construction. The middle tube is L-shaped and extends between the forward standing tube and the upper horizontal separation tube. This leaves an increased space in the rearward area of the stall separation. This space is only limited by the rearward standing tube. However, in practical use, even this improved stall construction has proven to be ill-suited for the anatomic characteristics of the animals. The middle tube is still likely to exert a pressure on the sensitive belly and rib area of the animal. Further, collisions occur between the animal and the corner of the L-shaped middle tube if the animal tries to get up. This not only causes injuries of the animal, but also a weakening of the construction after prolonged use. The L-shaped tubes will break off at their welding lines. Further, it has occurred that the cows try to assume a transverse position underneath the upper separation tube, whereby they get clamped between the tubing and the floor without being capable of freeing themselves.

An alternative free stall construction is known from Günther Koller, Rindviehställe, BLV-Verlagsgesellschaft Munich, 1979, page 61. In this construction the rearward stand tube is not positioned at the end of the stall, but rather in the middle of the stall. An arc-shaped tube member extends from this tubing tube backward. This mode of construction exhibits considerable stability problems. During prolonged use, the cantilever arc-shaped tube member will be torn off the stand tube. The instability increases with an increase of the length of the arc-shaped tube member. Therefore the arc-shaped tube member must be relatively short, such that a transverse position of the resting animal is not prevented. Further, the standing tube cannot be positioned sufficiently far to the front in order to prevent injuries of the resting animal in the area of the belly and the ribs. Further, neither this construction nor any of the other prior art constructions prevents cows from jumping on to other cows standing in the stalls.

Therefore it is an object of the present invention to provide a free stall construction which has an increased stability.

Further, it is an object of the present invention to provide a free stall construction which prevents the animals from assuming a transverse resting position.

Further, it is an object of the present invention to provide a free stall construction which gives sufficient moving space to the animal and which prevents injuries of the animal.

Finally it is an object of the present invention to provide a free stall construction which prevents animals from jumping on to other animals standing in the stalls.

According to the present invention, a free stall construction is provided which comprises cantilever tube members separating the stalls from each other and being secured to the ground in the shoulder area of the lying animal and extending upward and backward. The tube members are rigidly connected with a crossbeam. Each tube member extends with an increasing ground clearance and with decreasing inclination from the shoulder area to the end area of the stall and from there steeply upward beyond the standing animal. The crossbeam is connected with the rear upper ends of the tube member and located at such a height that the access of the stalls is not hindered.

The free stall construction according to the invention shows an extraordinary stability, even though the cantilever tube members extend from the shoulder area of the animal to the rearmost end of the resting surface of the stalls. This stability is provided by the crossbeam and it is comparable to the most stable prior art free constructions. Due to the extension of the tube member across the full length of the stall, the animals cannot assume a transverse resting position. The resting animals touch the tube members only in the shoulder area, so that they can assume a most comfortable side position without any bruises or injuries in the rib area. Due to the slant of the tube members, the animals are not hindered when they try to get up from their resting position, even if they have been resting in a slightly slanted position underneath the tube member. Further, the crossbeam prevents animals from trying to jump on to other animals standing in the stalls. The free stall construction according to the present invention allows an economical utilization of the available space. The resting surfaces may be shortened and the separating tube members may be closer to each other as compared to prior art free stall constructions, while the animals enjoy the same comfort.

The invention will not be explained by means of drawings.

Figure 1:
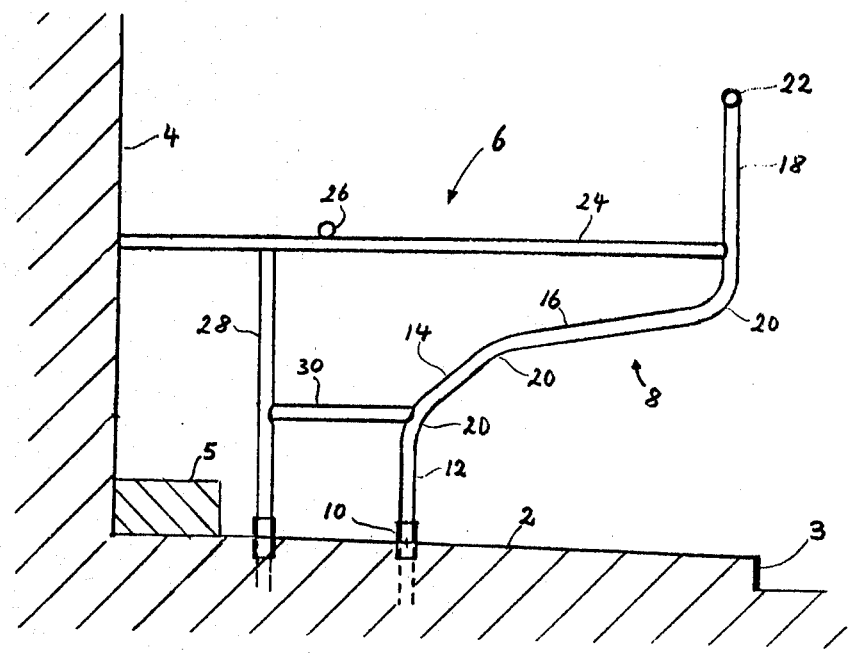
FIG. 1 shows a side view of a first embodiment of the free stall construction of the present invention.

FIG. 1 shows a first embodiment of the free stall construction of the present invention with one single row of resting stalls 2, which are defined at their front end by a wall 4 and at their rearward end by a step 3. The resting surface 2 is slightly inclined. The head space is defined by a step 5. The individual stalls 2 are separated from each other by stall separation 6 of tubes. The stall separation 6 comprises a curved tube member 8. It is inserted into the ground by means of a corrosion protection tube 10. It is sub-divided into an approximately vertical front section 12, a first intermediate section 14 with a greater inclination angle and a second intermediate section 16 with a lesser inclination angle and finally a rearward approximatey vertical section 18. The front section 12 of the tube member 8 is connected with the ground at approximately the shoulder region of the resting animal. Since the individual animals have different body size, their position relative to the resting surface may vary. Therefore, the exact position of the vertical section 12 of the tube member 8 must be determined according to the average body size of the animals to be housed in the free stall. However, it is essential that the front section 12 of the tube member 8 will not be located behind the shoulder of the animal. Tests have shown that for cattle types common in Germany the vertical front section 12 should have a distance from the rearmost edge 3 of the resting surface of about 100 to 140 cm, preferably 110 to 130 cm and especially about 120 cm. Both intermediate sections 14, 16 are inclined relative to the horizontal direction. The first middle section 14 is shorter than the second middle section 16. Further the first middle section exhibits a greater inclination angle than the second middle section 16. Tests have shown that the first middle section 14 should have an inclination angle of preferably 30° to 60°, especially 40° to 50° and particularly 45°. The second middle section 16 should have an inclination of preferably 10° to 30°, especially 15° to 25° and particularly about 20°. The transition between the first middle section 14 and the second middle section 16 should be located at a distance of preferably about 20 to 40 cm, especially about 25 to 35 cm and particularly about 30 cm behind the vertical section 12. Both middle sections 14 and 16 form a cantilever 8, which extends to the end area of the resting surface 2. The shape of the sections 12, 14 and 16 is chosen such that the resting animal contacts only the front section 12 and the first intermediate section 14 and preferably only the lower part of the first intermediate section 14. These parts of the tube member 8 are touched only by the relatively pressure-insensitive shoulder areas of the animals. The slanted arrangement of the middle section 14 is adapted to the anatomy of the animal. Further, the slanted arrangement of both middle sections 14 and 16 facilitates the movement of the animal when it is getting up from a resting position. The movement of the animal is not hindered by the tube member 8 even if the animal assumes a slightly slanted position underneath the second middle section 16. The ground clearance of the two middle sections 14 and 16 is sufficient, so that the animal may assume the most comfortable natural side position when resting in the stall. Even in this most comfortable position none of the areas of the body behind the shoulder area will be bruised by the tube member 8. Therefore, injuries of the cows are completely avoided.

The middle section 16 of the tube member 8 is followed by a rearmost section 18, which extends approximately vertically upward. The horizontal distance between this vertical rearmost section 18 and the rearmost edge 3 of the resting surface 2 is relatively short. Therefore the two intermediate sections 14, 16 extend almost to the end of the resting surface 2. This prevents the animals from assuming a transverse position within the stall. Preferably the intermediate section 16 does not extend to the very edge 3 of the resting surface 2, in order to provide easier access of the stalls. Preferably the horizontal distance between the rearmost vertical section 18 of the tube member 8 and the rearmost edge 3 of the resting surface 2 is about 0 to 30 cm, particularly about 5 to 25 cm and especially about 10 to 20 cm. The transitions between the individual sections are rounded off in order to prevent injuries of the animals.

Further, a horizontal crossbeam 22 is provided. It is connected with all tube members 8 of one row of stalls by means of sleeve joints. By means of this crossbeam 22 a rigid three-dimensional structure is achieved. The cantilever tube members 8 are prevented from being bent or loosened by the animals even in prolonged use. The height of the crossbeam 22 is chosen such that the animals may freely walk into the stalls. Further the crossbeam 22 prevents other animals from jumping on to animals standing in the stalls. The distance between the crossbeam 22 and the uppermost part of the body of the standing animal is preferably 5 to 25 cm, especially 10 to 15 cm and particularly about 10 cm.

A separation tube 24 extends from the curved tube member 8 to the wall 4. It carries a neck bar 26, the position of which is adjustable. Immediately in front of the step 5 a stand tube 28 is provided, which supports the separation tube 24. Finally, an intermediate separation tube 30 extends from the tube member 8 to the stand tube 28. in this manner a free space is provided for sideward movements of the head of the animal.

Figure 2:
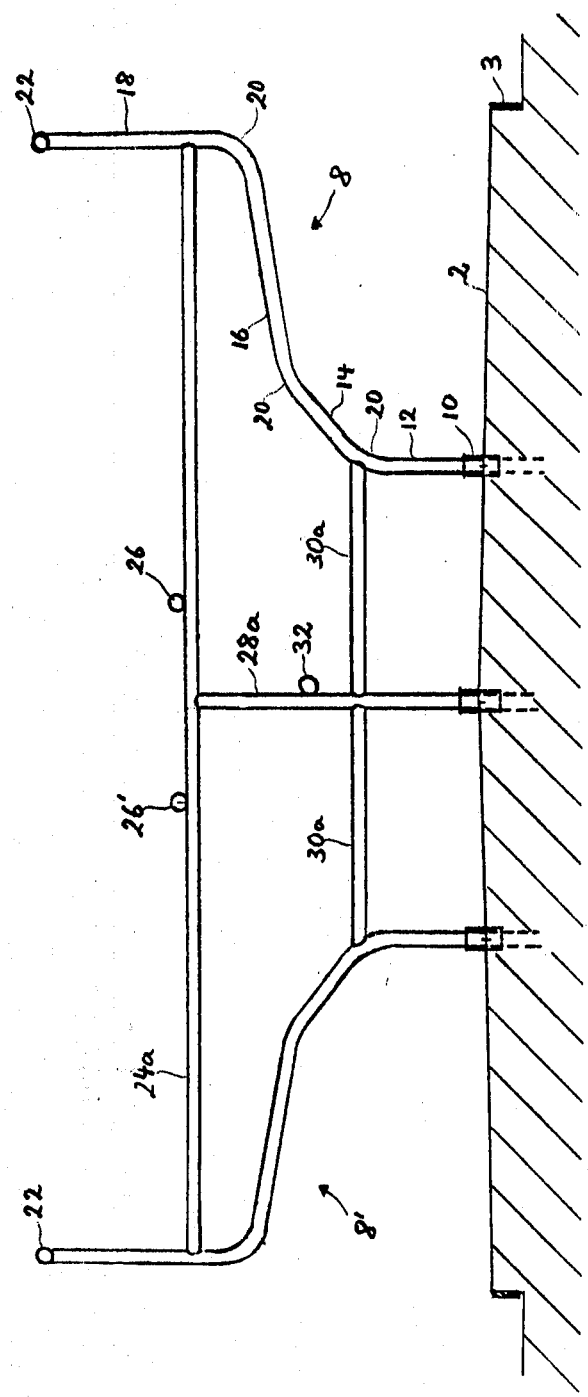

FIG. 2 shows a second embodiment of the free stall construction of the present invention for a double row of resting stalls in opposite orientation. Identical reference numbers are used for identical or corresponding parts as in FIG. 1 and the description of these parts will not be repeated. In this embodiment each two curved tube members 8, 8' are arranged opposite from each other. They are connected by an upper separation tube 24a and a lower separation tube 30a. The upper separation tube 24a carries two neck bars 26, 26', the positions of which are adjustable. The separation tubes 24a and 30a are welded on to a central stand tube 28a. Further, the stand tubes 28a of all stalls carry a barrier tube 32, which prevents the animal from walking into the opposite stall. When the animal is resting its head is located below the barrier tube 32 and it may extend into the opposite stall. Further, if the animal is standing, its head is positioned above the barrier tube 32 and may also extend into the opposite stall.

Figure 3:
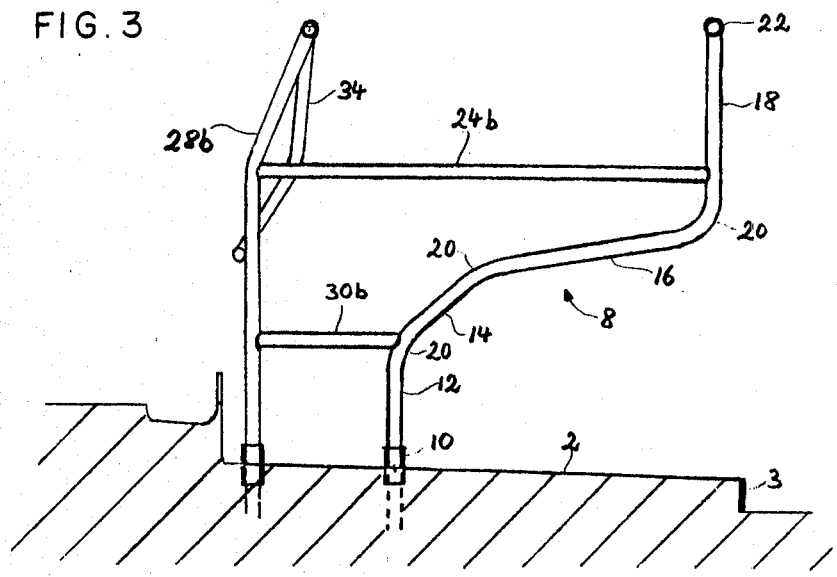
FIG. 2 shows a side view of a second embodiment of the free stall construction of the present invention and FIG. 3 shows a side view of a third embodiment of the present invention.

FIG. 3 shows a third embodiment of the free stall construction of the present invention with a row of stalls for feeding and resting. Identical reference numbers are used again for identical or corresponding parts. An upper separation tube 24b and a lower separation tube 30b are welded onto the curved tube member 8 and extend horizontally to a stand tube 28b. Further the usual neck yoke 34 is provided.

I claim:

1. Cattle free stall construction for providing a resting feeding/place for cattle in which the cattle may move in and out freely and lay down therein without interfering with other cattle in adjacent stalls comprising a plurality of cantilever tube members separating the stalls from each other, said cantilever tube members being secured to the ground in the shoulder area of a reclining animal, said cantilever tube members extending upward and rearward to an end area of the stall where said members extend steeply upward beyond a standing animal, and a crossbeam (22) rigidly connecting the rear upper ends of said tube members (8) at a height such that cattle access to the stalls (2) is not hindered.

2. Free stall construction according to claim 1, characterized in that the tube members (8) comprise at least two inclined middle sections (14, 16) between an approximately vertical front section (12) and an approximately vertical rearward section (18), whereby the forward one of said middle sections has the greatest inclination and the rearward one of said middle sections has the smallest inclination.

3. Free stall construction according to claim 2, characterized in that the forward vertical section (12) has a height of about 35 to 45 cm.

4. Free stall construction according to claim 2, in which the forward one of said middle sections has an average inclination of 45°±15° and the rearward one of said middle section has an average inclination of 20°±10°, relative to the horizontal direction.

5. Free stall construction according to claim 4, characterized in that the transition between the two middle sections (14, 16) is positioned approximately 25 to 35 cm behind the front vertical section (12).

6. Free stall construction according to claim 1, characterized in that the tube member (8) comprises a plurality of linear sections (12, 14, 16, 18) and rounded transitions (20).

7. Free stall construction according to claim 1, characterized in that the rearward end of said tube member (8) has a distance of from 0 to 25 cm from the end of the stall.

8. Free stall construction according to claim 1, characterized in that the crossbeam (22) is positioned at about 5 to 25 cm above the standing animal.

9. Free stall construction according to claim 1, characterized in that the tube member (8) consists of a single bent tube.

10. Free stall construction according to claim 1 characterized by a one-row arrangement of resting stalls having a substantially horizontal upper separation tube (24) carrying a neck bar (26) and extending from said tube member (8) to a wall (4), said separation tube (24) being additionally supported by a vertical support tube (28) and a horizontal tube (30) extending below said separation tube (24) from said tube member (8) to said vertical tube (28).

11. Free stall construction according to claim 1, characterized by a double-row arrangement of resting stalls facing each other having an upper separation tube (24a) carrying two neck bars (26, 26') and a lower separation tube (30a) which both extend from one tube member (8) approximately horizontally to the opposite tube member (8') and having an approximately vertical middle supporting tube (28a) carrying a barrier bar (32) for separating the opposite stalls.

12. Free stall construction according to claim 1, characterized by an arrangement of combined feed-resting stalls having an upper separation tube (24b) and a middle separation tube (30b) which extend approximately horizontally from said tube member (8) to a vertical tube (28b), which carries a neck yoke.

13. Free stall construction according to claim 1 characterized in that said cantilever tube members extend with increasing ground clearance and decreasing inclination from the shoulder area to said end area of the stall.

* * * * *